United States Patent [19]
Butkovich et al.

[11] Patent Number: 5,099,635
[45] Date of Patent: Mar. 31, 1992

[54] DRIVE SYSTEM FOR A COTTON HARVESTER

[75] Inventors: George M. Butkovich, Lemont; Troy D. Bateman, Bolingbrook, both of Ill.

[73] Assignee: J. I. Case Company, Racine, Wis.

[21] Appl. No.: 624,321

[22] Filed: Dec. 4, 1990

[51] Int. Cl.⁵ ............................................. A01D 46/08
[52] U.S. Cl. ..................................... 56/13.5; 56/15.2; 56/28; 56/DIG. 6
[58] Field of Search ................... 56/13.5, 15.1, 15.2, 56/28, 30, DIG. 6, DIG. 14

[56] References Cited

U.S. PATENT DOCUMENTS

| | | | |
|---|---|---|---|
| 3,031,828 | 5/1962 | Graham | 56/15.1 |
| 4,249,365 | 2/1981 | Hubbard et al. | 56/28 X |
| 4,993,216 | 2/1991 | Covington et al. | 56/DIG. 14 X |

OTHER PUBLICATIONS

J. I. Case 1822 and 1844 Service Manual (1985), pp. 6035-5, 6035-6, 6035-7, 6035-9, and 6035-10, illustrating a conventional drum drive housing for a cotton harvester.

*Primary Examiner*—Terry Lee Melius
*Attorney, Agent, or Firm*—Dressler, Goldsmith, Shore, Sutker & Milnamow, Ltd.

[57] ABSTRACT

A drive assembly for a cotton harvester with harvesting units mounted for vertical movement about a fixed axis and for lateral movement across a front end of the harvester. The drive assembly includes a harvesting unit drive section and a transmission section which are driven by a common power input. The harvesting unit drive section includes an upright fluidically sealed housing with an output shaft assembly and a pair of modular drive units supported and connected to the housing at opposite ends of the output shaft assembly. An elongated modular support connects at least one of the drive units to the housing to optimize the lateral location of the driving units and thereby maximizing transfer of rotary power through the harvesting unit drive section.

9 Claims, 3 Drawing Sheets

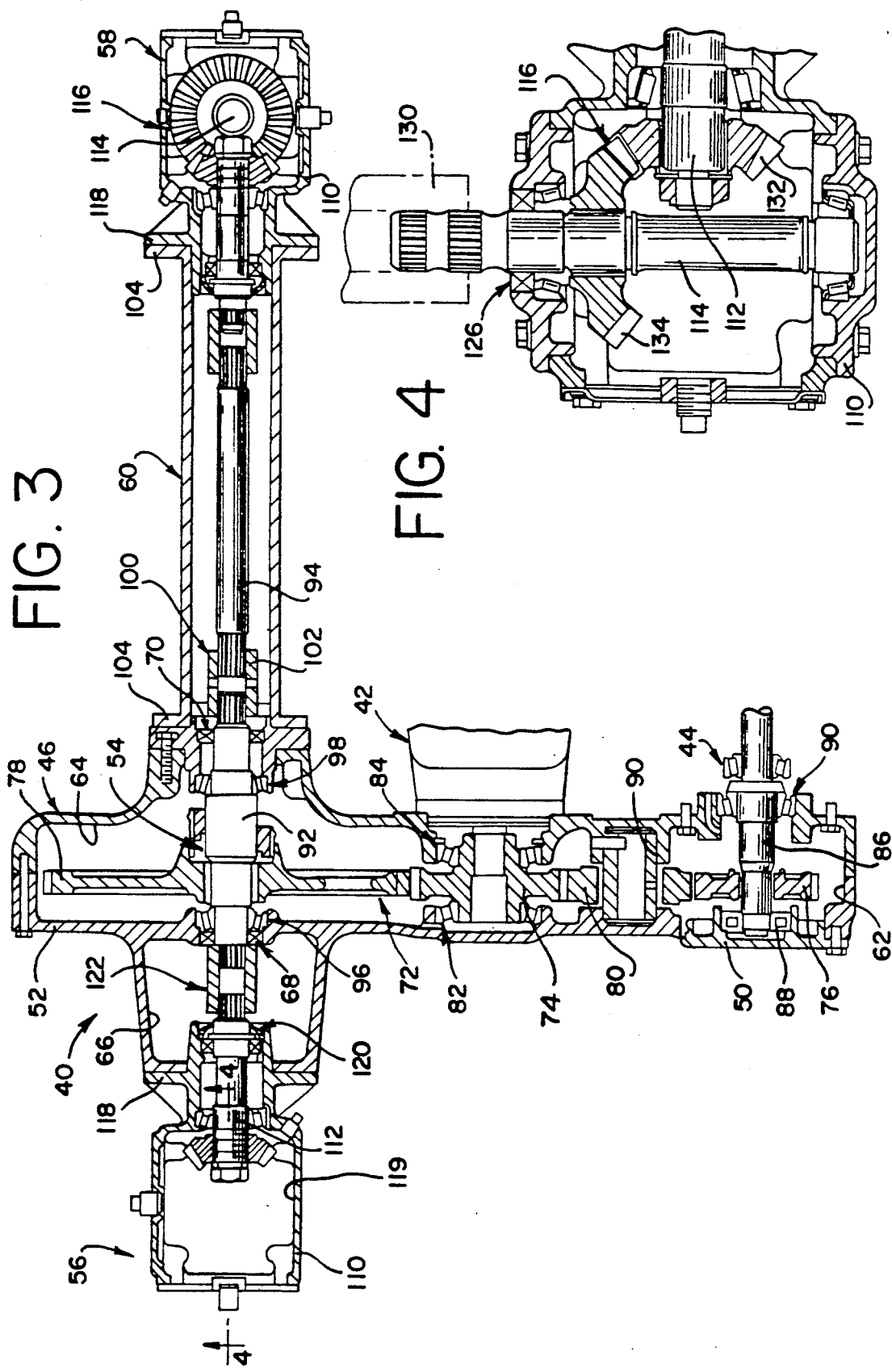

DRIVE SYSTEM FOR A COTTON HARVESTER

FIELD OF THE INVENTION

The present invention generally relates to cotton harvesters and. more particularly, to a system for driving laterally and vertically movable harvesting units of the cotton harvester.

BACKGROUND OF THE INVENTION

A conventional cotton harvester includes a mobile frame having two or more harvesting units supported at a forward end thereof. A lift assembly supports the harvesting units on the frame of the harvester. To promote movement of the harvester from one location to another, the lift assembly supports the harvesting units for vertical movement between a lower operational position and a raised transport position. To facilitate servicing thereof and different row spacings therebetween, the harvesting units are laterally adjustable across the forward end of the harvester frame. When the harvesting units are laterally adjusted in skip row patterns, the lateral spacing between adjacent harvesting units may range from 40 to 64 inches.

Each harvesting unit on the harvester includes a harvesting mechanism. A typical harvesting mechanism includes a pair of picker rotor assemblies mounted to the side of a plant passage allowing cotton plants to pass through the harvesting unit as the harvester is driven across the field. At its upper end, each harvesting unit further includes a drive mechanism including a gearbox for imparting rotary movement to the harvesting mechanism.

The drive mechanism of each harvesting unit is driven from a drive assembly mounted on the frame of the harvester. To facilitate cotton removal while minimizing damage to the cotton plants, the drive assembly drives the harvesting units in timed relation to the ground speed of the harvester. A typical drive assembly uses a hydrostatic drive mechanism driven by the engine of the harvester for concurrently driving the harvester and the harvesting units More specifically, the hydrostatic drive mechanism is connected to and drives a transmission of the harvester and a pair of laterally spaced drive shafts extend from the drive assembly to individually drive the harvesting units.

It is known to provide a drive assembly wherein laterally spaced gearboxes are provided as an integral part and at opposite ends of a drive assembly housing. Each gearbox is interconnected to a harvesting unit by a fore-and-aft extending drive shaft. The housing and gearboxes of the drive assembly are designed with lubricant passageways therebetween to provide adequate lubricant between the housing and gear mechanisms and bearings in the gearboxes. Although serving an identical function to the gearboxes on the harvesting units, the gearboxes of heretofore known drive assemblies were limited to use at opposite ends of the drive assembly housing and were not interchangeable in other areas of the harvester. Accordingly, there was a substantial duplication of mechanisms within the harvester.

While the compactness of the heretofore known drive assembly offered spatial benefits, certain drawbacks were also inherent with such a compact design. As will be appreciated, the compactness of the heretofore known drive assembly provided limited lateral spacing between the gearboxes. The spacing between the gearboxes on the drive assembly was substantially less than the lateral spacing between adjacent harvesting units arranged in a skip row pattern. Accordingly, the drive shafts extending forwardly from the gearboxes were angularly disposed to compensate for the lateral misalignment between the gearbox and the harvesting unit. Depending on the severity of the drive shafts angular position, in some instances there was substantial power loss resulting from the geometry of the drive shaft relative to the respective gearbox. Such misalignment between the gearboxes and the harvesting units mandated use of a constant velocity drive shaft for transferring rotary power from the drive assembly to the harvesting unit. As will be appreciated, use of a constant velocity drive shaft as compared to a cardan drive shaft substantially increases the manufacturing costs of the drive assembly and, thus, increases the overall cost of the machine.

Thus, there is a need and a desire for a cotton harvester drive system which is designed to facilitate transfer of rotary power therethrough and is quickly and readily adaptable to changes in row spacings of the harvesting units.

BRIEF DESCRIPTION OF THE PRESENT INVENTION

In view of the above, and in accordance with the present invention, there is provided a drive assembly for a cotton harvester having at least two independently driven harvesting units supported on a frame of the cotton harvester in a particular row configuration. The harvesting units are supported for vertical movement through a predetermined range about a fixed axis and for lateral movement across a front end of and relative to the harvester frame. The drive assembly includes a harvesting unit drive section and a transmission section which are driven by a common power input. The harvesting unit drive section comprises a fluidically sealed housing with a laterally extending rotary output shaft assembly and a pair of fluidically sealed modular drive units supported on the housing and connected at opposite ends to the output shaft assembly. An elongated modular support connects at least one of the modular drive units in an extended laterally spaced relation to the housing. Separation of the modular drive unit from the housing allows the drive units to be generally aligned in a lateral direction relative to the harvesting units to which they are connected thereby maximizing transfer of rotary power through the harvesting unit drive section.

In a preferred form of the invention, the harvesting unit drive section further includes a gear mesh for joining the common power input to the output shaft assembly and to the transmission section such that the harvesting units are driven in timed relation to the movement of the harvester. The gear mesh includes an input drive gear driven by the power input, a transmission section drive gear and a harvesting unit section drive gear mounted on opposite vertical sides of the input drive gear and with the harvesting unit section drive gear being connected to the output shaft assembly. An idler gear is interposed between the input gear and the transmission section drive gear for facilitating an increase in the height of the harvesting unit drive section Increasing the height of the harvesting unit drive section allows the drive units to be vertically positioned relative to the range of vertical movement of the harvesting units and thereby maximize the transfer of rotary power through the harvesting unit section.

In the illustrated embodiment, the common power input for the drive section includes a hydrostatic drive mechanism. The hydrostatic drive mechanism is mounted on the housing of the harvesting unit drive section and has an output which drives the harvesting unit drive section and the transmission section in timed relation relative to each other.

The output shaft assembly of the harvesting unit drive section preferably includes a first shaft connected to the harvesting unit section drive gear and at least one extension shaft connected at opposite ends to the first shaft and to a drive unit. Splined couplings at opposite ends of the extension shaft facilitate the positive transfer of rotary power between the output shaft assembly and the drive unit.

Each harvesting unit includes a drive mechanism including a gear box. To promote interchangeability of components and thereby reduce manufacturing costs, the modular drive units on the drive assembly can likewise be used as gearboxes for the drive mechanism on the harvesting units. Each drive unit has a fluidically sealed housing which encloses a gear arrangement for positively transferring rotary power between the output shaft assembly and the harvesting units.

In a preferred form of the invention, the gear arrangement of the drive unit includes a bevel gear set, with one bevel gear being connected to and driven by the output shaft assembly of the drive assembly and the other bevel gear being connected to a fore-and-aft extending cardan drive shaft connected at its opposite end to a harvesting unit. Moreover, each drive unit defines a lubricant reservoir which is separate from the lubricant reservoir in the harvesting unit drive section housing. This eliminates extensive lubricant flow designs throughout the drive system. Moreover, the use of separate reservoirs also allows the use of different lubricants in the gearboxes than that used in remainder of the harvesting unit drive section.

With the present invention, the output of the drive units are positioned to optimize the transfer of rotary power given a particular row spacing between harvesting units on the harvester. The ability to enhance the drive shaft geometry furthermore allows the use of cardan joint drive shafts rather than the more expensive constant velocity drive shafts. Individualizing the drive units also provides flexibility for arranging the harvesting units in all skip row patterns with the same cardan joint drive shafts. The elimination of extensive lubricant flow passageways throughout the drive system, provides a simple and cost effective means of transferring power to the harvesting units of the cotton harvester.

Numerous other features and advantages of the present invention will become readily apparent from the following detailed description, the accompanying drawings, and the appended claims.

DESCRIPTION OF THE DRAWINGS

FIG. 3 is a longitudinal sectional view taken along line 3—3 of FIG. 2; and

FIG. 4 is a sectional view taken along line 4—4 of FIG. 3.

DESCRIPTION OF THE PRESENT INVENTION

Figure 1:
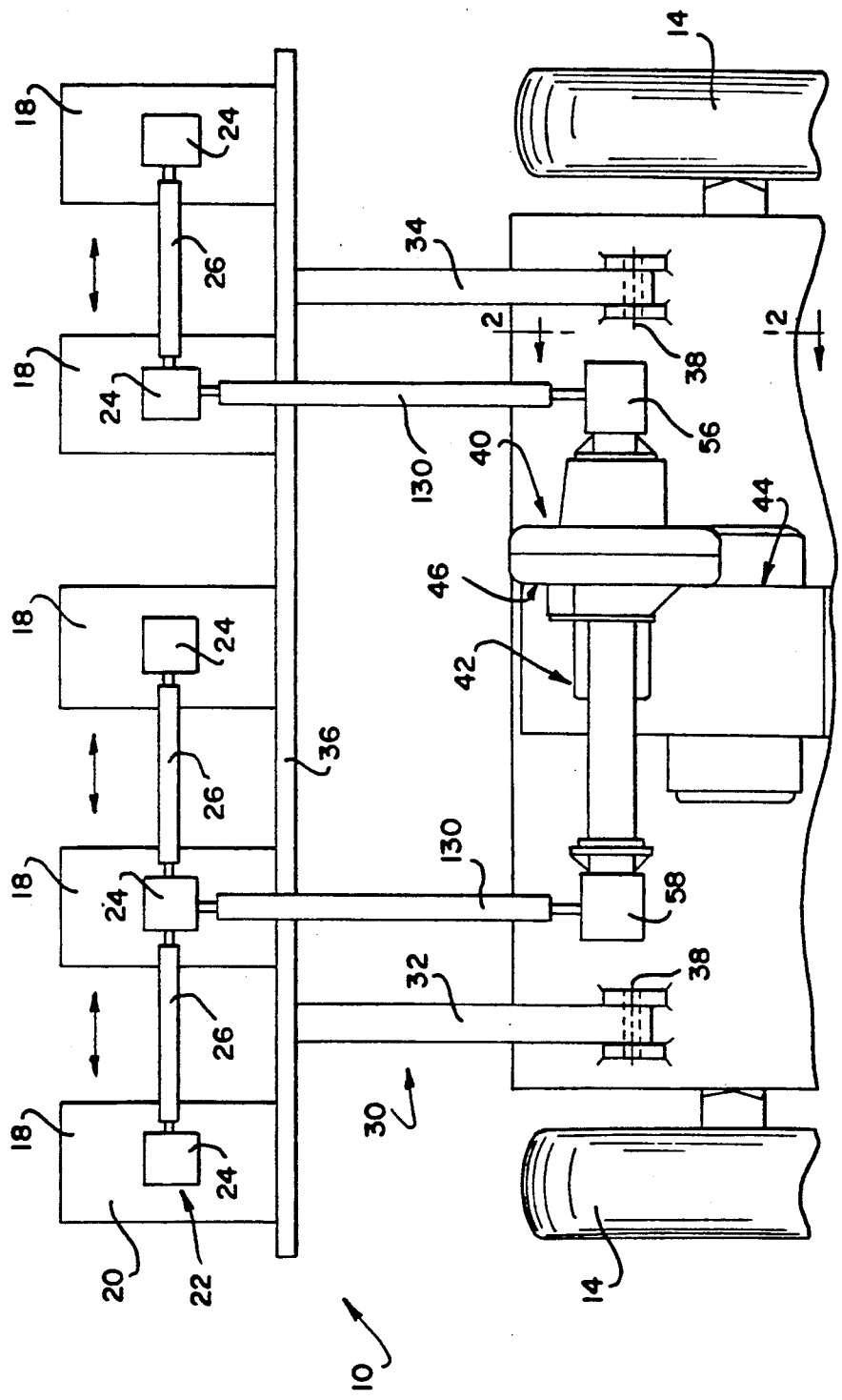
FIG. 1 is a schematic plan view of a cotton harvester embodying a drive system according to the present invention.

While the present invention is susceptible of embodiment in various forms, there is shown in the drawings a presently preferred embodiment hereinafter described with the understanding that the present disclosure is to be considered as exemplification of the invention and is not intended to limit the invention to the specific embodiment illustrated.

Referring now to the drawings, wherein like reference numerals indicate like parts throughout the several views, there is a shown a self-propelled cotton harvester which is depicted only fragmentarily and is seen as represented in its entirety in FIG. 1 by reference numeral 10. Cotton harvester 10 has a fore-and-aft extending frame 12 mounted for movement over a field on a pair of ground engaging front wheels 14. A pair of steerable rear wheels (not shown) provide the harvester with proper direction.

Positioned forwardly on the harvester frame 12 are a plurality of individual cotton picker harvesting units 18. As illustrated, the harvesting units are arranged in a side-by-side relationship for harvesting adjacent and generally parallel rows of cotton as the harvester is driven across the field. It should be appreciated, however, that this invention equally applies to a lesser number of harvesting units than that illustrated.

In a preferred form of the invention, each of the harvesting units is substantially similar in construction. As shown, each harvesting unit includes a fore-and-aft extending framed housing 20 which encloses and mounts a rotatably driven harvesting mechanism including a pair of picker rotor assemblies and a pair of doffer assemblies (not shown). An upper portion of harvesting unit housing 20 supports a drive assembly 22 for providing rotary power to the harvesting mechanism from a gearbox 24 attached to the top of the housing 20.

In the illustrated embodiment, two of the harvesting units are independently driven. The gearboxes 24 of the remaining harvesting units are connected to the independently driven gearboxes through telescoping drive shaft assemblies 26 which allow for lateral movement of the harvesting units with respect to each other without loss of power therebetween.

The harvesting units 18 are supported at a forward end of the harvester by a lift assembly 30. The lift assembly 30 can be of the type described in detail and co-assigned U.S. Pat. No. 5,010,718, entitled A SYSTEM FOR MOUNTING AND SUPPORTING HARVESTING UNITS ON A COTTON HARVESTER, the entirety of which is incorporated herein by reference. As shown, the lift assembly 30 includes a pair lift arms 32 and 34 and an elongated tool bar assembly 36 joined to and laterally extending across a forward end of the lift arms 32 and 34. The harvesting units are individually connected to the tool bar assembly 36 to permit them to be adjusted laterally relative to each other in a particular row configuration so as to adapt to different row widths and/or for facilitating inspection and maintenance of the harvesting units. The opposite end of each lift arm 32, 34 is pivotally connected to the frame about a fixed axis 38 such that the harvesting units can vertically move through a range of movement extending between a lower operative position and a raised transport position.

To promote the removal of cotton from and while minimizing damage to the cotton plants, the harvester frame 12 is moved and harvesting units 18 are driven in timed relation to each other through a drive assembly 40 constructed in accordance with principles of the present invention. In the preferred embodiment, the cotton harvester drive assembly 40 includes a power input 42 which conjointly provides driving power to both a transmission section 44 and a harvesting unit drive section 46.

In the preferred form of the invention, the common power input 42 for the drive system 40 is a hydrostatic drive mechanism 48 which is generally of conventional construction and is of the type utilized, for example, on J.I. Case Model No. 1800 Cotton Harvesters. The hydrostatic drive includes a fixed displacement motor driven by a variable displacement pump connected to the engine of the harvester.

Figure 2:
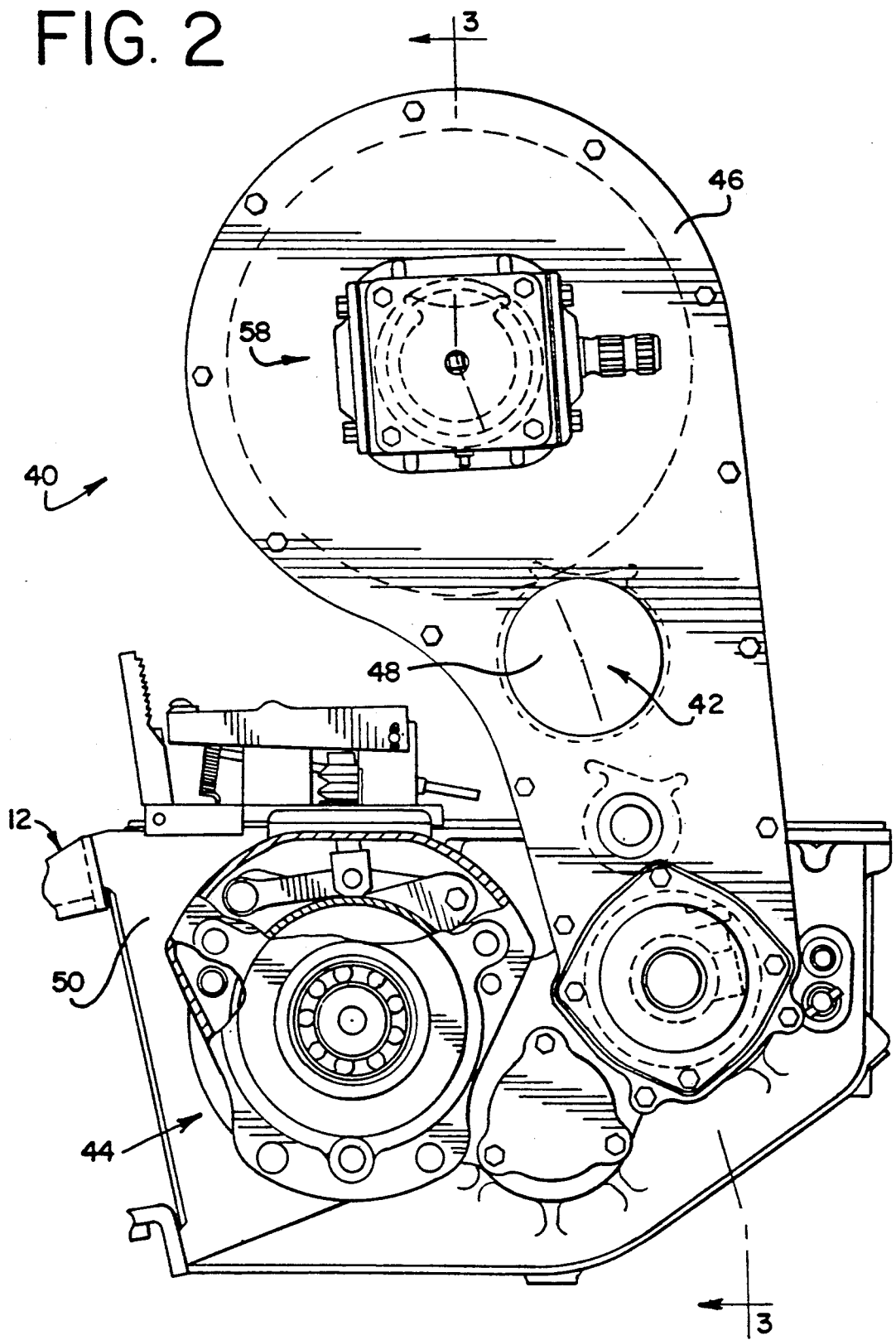
FIG. 2 is a side elevational view taken along line 2—2 of FIG. 1.

As shown in FIG. 2, the transmission section 44 of the drive system 40 includes a transmission 50 which is mounted on and supported by the frame 12 of the harvester 10. The transmission 50 can be conditioned or shifted from a neutral or park position to a plurality of gear ratios through selective actuation of a gearshift lever (not shown), typically located in a cab region of the harvester.

Turning now to FIG. 3, the harvesting unit drive section 46 comprises a fluidically sealed housing 52 with a laterally extending output shaft assembly 54 rotatably mounted toward an upper end thereof. A pair of fluidically sealed modular drive units 56 and 58 are supported on the housing 52 and are individually connected to the harvesting units. At least one elongated modular support 60 advantageously supports drive unit 58 in an extended laterally spaced relation to housing 52 to optimize the lateral location of the drive units 56 and 58 relative to the harvesting units 18 to which they are connected thereby maximizing transfer of rotary power through the harvesting unit drive section 46.

Housing 52 extends upright from the transmission 50 and defines a lubricant reservoir 62 at a lower end thereof. As shown, housing 52 is divided into a lubricated chamber 64 and at least one dry chamber 66 arranged adjacent the lubricated chamber 64. As shown, the output shaft assembly 54 extends in opposite lateral directions from the lubricated chamber 64 of housing 52. While allowing the shaft assembly 54 to laterally extend therebeyond, suitable seals 68 and 70 inhibit lubricant from leaking from the housing 52 along the diameter of the shaft assembly 54.

A gear mesh 72 is provided within housing 52 for joining and conjointly transferring rotary power from the power input 42 to both the output shaft assembly 54 and to the transmission section 44. As shown in FIG. 3, the gear mesh 72 preferably includes an input drive gear 74, a transmission section drive gear 76, a harvesting unit section drive gear 78, and an idler gear 80.

As will appreciated, input drive gear 74 is connected to and driven by the power input 42. As shown, suitable bearings 82 and 84 arranged within housing 52 support the gear 74 for rotation.

Transmission section drive gear 76 is rotatably mounted within the housing 52 preferably beneath the input drive gear 74 and in intermeshing engagement therewith. As shown, transmission section drive gear 76 is fixedly mounted on input drive shaft 86 to the transmission 50. Suitable bearings 88 and 90 arranged within housing 52 support the input drive shaft 86 of the transmission 50.

Harvesting unit section drive gear 78 is rotatably mounted within the housing 52 preferably on an opposite side above the input gear 74 and in intermeshing relationship therewith to facilitate timed operation of the harvesting units with movement of the harvester across the cotton field. As shown, the drive gear 78 is fixedly secured to the output drive shaft assembly 54 within the lubricated chamber 64 of housing 52 thereby assuring adequate lubrication of the bearings and other support components within the housing 52.

Idler gear 80 is positioned within the housing 52 and arranged in combination with the gear mesh to promote proper vertical placement of the drive units 56 and 58 relative to the fixed axis 38 about which the harvesting units vertically move between lowered and raised positions thereby optimizing the transfer of rotary power and torque through the harvesting unit drive section 46. As shown, idler gear 80 is preferably interposed between and in intermeshing engagement with input drive gear 74 and transmission section drive gear 76. Idler gear 80 is rotatably mounted on a stub shaft 90 affixed within the housing 52.

Output shaft assembly 54 is rotatably mounted toward an upper end of the harvesting drive section 46 and has its opposite lateral ends connected to the modular drive units 56 and 58. In a preferred form, the drive shaft assembly 54 comprises a first shaft 92 and an extension shaft 94. First shaft 92 is journalled at opposite ends within suitable bearings 96 and 98 carried by the housing 52. As shown, free ends of first shaft 92 preferably extend laterally beyond the lubricated chamber 64 defined by housing 52 to facilitate interconnection of the output shaft assembly to the drive units 56 and 58. A suitable coupling 100 is used to couple the first shaft 92 to the extension shaft 94 in a manner facilitating positive transfer of rotary motion therebetween. In a preferred form of the invention, the coupling 100 includes a splined collar 102 which engages spline configurations provided at adjacent end regions on the first shaft 92 and the extension shaft 94.

The elongated modular support 60 has a generally hollow configuration with the extension shaft 94 of output drive shaft assembly 54 extending endwise therethrough. Opposite ends of support 60 are provided with flanges 104 to facilitate connecting the support to adjacent structure. Notably, interchangeable supports 60 and extension shafts 94 can be used to laterally position the drive unit 58 in a desired lateral position relative to the harvesting unit to which it is connected thereby optimizing the lateral location of the drive units relative to the harvesting units to which they are connected and thereby maximizing transfer of rotary power through the harvesting unit drive section.

The modular drive units 56 and 58 are substantially similar in construction. Notably, the modular units 56 and 58 are interchangeable with the gearboxes 24 provided on the harvesting units thereby reducing duplication of parts throughout the cotton harvester. Because drive units 56 and 58 are substantially similar, only drive unit 56 will be described in detail with the understanding that drive unit 58 is of substantially similar construction.

As shown in FIGS. 3 and 4, each drive unit includes a housing 110 which rotatably mounts an input shaft 112, an output shaft 114, and a gear arrangement 116. Housing 110 of each drive unit includes a mounting flange 118 which facilitates attachment of the drive unit to adjacent structure. Moreover, each housing 110 defines a closed lubricant reservoir 119 which is independent of the lubricant reservoir 62 defined by housing 52. Designing each drive unit with its own lubricant reservoir eliminates extensive lubricant flow designs throughout the drive assembly and furthermore allows the use of different lubricants in the drive units 56 and 58 than that used in housing 52.

As shown in FIG. 3, input shaft 112 extends beyond the housing 110 of the drive unit and into a dry area or chamber associated with housing 52. Suitable seal means 120 surrounds the shaft 112 and inhibits lubricant from leaking along the diameter thereof. At one end, the input shaft 112 is coupled to the output shaft assembly 54. A coupling 122 similar to coupling 100 described above, positively transfers power from the output drive shaft assembly 54 to the drive unit.

Turning to FIG. 4, at least one end of output shaft 114 likewise extends beyond the housing 110 of the drive unit. Suitable seal means 126 surrounds the shaft 114 and inhibits lubricant from leaking along the diameter thereof. At one end, the output shaft 114 is coupled to a drive shaft 130 which extends forwardly from the drive assembly of the cotton harvester and serves to transfer rotary power from one of the drive units of the drive assembly to one of the drive mechanisms 22 on a harvesting unit. To facilitate transfer of rotary power, the free end of output shaft 114 may have a spline configuration which cooperates with a groove configuration on the drive shaft 130. A suitable detent mechanism (not shown) flexibly joins the drive shaft 130 to the output shaft 114 of each drive unit.

In the illustrated embodiment, the gear mechanism 116 is designed as a bevel gear set. The bevel gear set includes a first bevel gear 132 being affixed for rotation with input shaft 112 and a second intermeshing bevel gear being connected to the fore-and-aft extending output shaft 114. The interengagement between the gears 132 and 134 affects positive power transfer between the output shaft assembly 54 and the harvesting unit to which the output shaft 114 is connected.

A salient feature of the present invention is the ability to optimize the location of the drive units 56 and 58 relative to the particular row spacing of the harvesting units 56, 58 relative to the housing 52 which they are adapted to drive. The elongated modular support 60 connects at least one of the drive units in laterally spaced relation to the housing 52. Accordingly, the drive units 56,58 can be laterally located in generally aligned fore-and-aft relation to the harvesting units to which they are respectively connected thereby maximizing transfer of rotary power through the harvesting unit drive section. Optimizing the lateral location of the modular drive units 56, 58 with respect to the chassis centerline, combined with the orientation of the output shaft 114 extending from the drive assembly furthermore enhances the drive shaft geometry. As a result, the drive assembly of the present invention is connected to the harvesting units through conventional cardan joint drive shafts rather than the more expensive constant velocity drive shafts which have heretofore been used to effect the same ends. Moreover, individualizing the drive units furthermore facilitates adaptation of the harvester to all skip row patterns. As will be appreciated, the use of a second modular support for interconnecting drive unit 56 to the housing 52 assures that the widest skip row patterns can be obtained while using the same cardan joint drive shafts in combination with the drive assembly.

As will be appreciated from FIGS. 2 and 3, the provision of idler gear 80 in the gear mesh 72 used to join the common power input 42 to both the transmission section 44 and the harvesting unit drive section 46 facilitates an increase in the height of the harvesting unit drive section Accordingly, the drive units are advantageously vertically located relative to the range of vertical movement of the harvesting units. Increasing the height of the harvesting unit drive section enhances the orientation of shaft 130 with respect to the vertical range of movement of the harvesting units thereby enhancing transfer of power and torque through the drive system.

Separation of the modular drive units 56, 58 from the housing 52 allows the use of different lubricants within the drive units as compared to the housing 52. Moreover, modularizing the design of the drive units facilitates their use in combination with the drive mechanism on the harvesting units and eliminates the need for extensive and intricate lubricant passages extending through the drive assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A drive assembly for a cotton harvester having at least two independently driven units supported on a fore-and-aft extending wheeled frame for vertical and lateral movements relative to said frame, said drive assembly comprising:

a harvesting unit drive section interconnected to and supported by a transmission section mounted on the frame of the harvester, said harvesting unit drive section and said transmission section having a common power input; an wherein said harvesting unit drive section comprises a fluidically sealed housing with a laterally extending rotary output shaft assembly drivingly connected to said common power input, a pair of modular drive units each independently connected to one of said harvesting units and driven by said output shaft assembly, each modular drive unit comprising a substantially sealed housing connected to opposite sides of said housing, and elongated modular support means for connecting and supporting at least one of said modular drive units in extended laterally spaced relation to said housing to optimize the lateral location of the drive units relative to the harvesting units to which they are connected thereby maximizing transfer of rotary power through the harvesting unit drive section.

2. The drive assembly according to claim 1 wherein said common power input includes a hydrostatic drive mechanism whose output drives said harvesting unit drive section and said transmission section in timed relation relative to each other.

3. The drive assembly according to claim 1 wherein each of said modular drive units includes a gear arrangement for positively transferring power from said laterally extending output shaft assembly of said harvesting unit drive section to said harvesting units.

4. The drive assembly according to claim 1 wherein said rotary output shaft assembly includes a first shaft rotatably mounted within the harvesting unit drive section housing and an extension shaft laterally extending through said elongated modular support and coupled at opposite ends to said first shaft and to said at least one of said drive units to facilitate fore-and-aft general alignment between said at least one of said drive units and the harvesting unit connected thereto thereby maximizing transfer of power through said harvesting unit drive section.

5. A drive assembly according to claim 1 wherein a fore-and-aft extending wheeled frame, at least two independently driven harvesting units, and a lift assembly for supporting said harvesting units in a particular row configuration on said frame and allowing for vertical movement of said harvesting units through a range of movement about a fixed axis and lateral movements across a front end of and relative to the harvester frame, said drive assembly comprising:

a fluidically sealed harvesting unit drive section interconnected to and supported by a transmission section mounted on the frame of the harvester, said harvesting unit drive section and said transmission section having a common power input; and wherein said harvesting unit drive section comprises a fluidically sealed upright housing, laterally extending output drive shaft assembly, said output drive shaft assembly being connected at opposite ends to modular drive units connected to opposite sides of said housing and independently connected to a harvesting unit by a drive shaft, each modular drive unit including a substantially fluid sealed housing, said drive section further including a gear mesh for joining the common power input to the output shaft assembly and to the transmission section, said gear mesh including an input drive gear driven by said power input, a transmission section drive gear and a harvesting unit section drive gear mounted on opposite vertical sides of said input drive gear, said harvesting unit section drive gear being connected to said output shaft assembly, and an idler gear interposed between said input gear and said transmission section drive gear for facilitating an increase in the height of the harvesting unit drive section to arrange the modular drive units relative to the range of vertical movement of the harvesting units, whereby reducing the angle of movement of the drive shaft upon vertical displacement of the harvesting unit, thereby enhancing the delivery of power to the harvesting units, said harvesting unit drive section further comprising elongated hollow support means for supporting at least one of said drive units in extended laterally spaced relation to said housing and in general fore-and-aft relation to the harvesting unit connected thereto thereby maximizing transfer of rotary power through the harvesting unit drive section for the particular row unit configuration.

6. The drive assembly according to claim 5 wherein said common power input includes a hydrostatic drive mechanism mounted on the housing of the harvesting unit drive section and which is adapted to drive said input drive gear of said gear mesh.

7. The drive assembly according to claim 5 wherein each drive unit includes a pair of bevel gears, with one bevel gear being connected to and driven by said output shaft assembly and the other bevel gear being connected to a fore-and-aft extending drive shaft which is connected at its opposite end to a harvesting unit.

8. The drive assembly according to claim 5 wherein said harvesting unit drive section housing defines a lubricant reservoir which is separate from a lubricant reservoir defined by each of said drive units.

9. The drive assembly according to claim 5 wherein said output shaft assembly includes a first shaft connected to said harvesting unit section drive gear and at least one extension shaft connected at opposite ends to said first shaft and to a drive unit.

* * * * *